United States Patent
Palmieri

(10) Patent No.: US 8,578,930 B2
(45) Date of Patent: Nov. 12, 2013

(54) LIGHTWEIGHT STRUCTURE VACUUM SOLAR THERMAL PANEL

(75) Inventor: Vittorio Palmieri, Geneva (CH)

(73) Assignee: TVP Solar SA, Geneva (CH)

( * ) Notice: Subject to any disclaimer, the term of this patent is extended or adjusted under 35 U.S.C. 154(b) by 240 days.

(21) Appl. No.: 13/056,532

(22) PCT Filed: Aug. 6, 2009

(86) PCT No.: PCT/EP2009/060204
§ 371 (c)(1),
(2), (4) Date: Jan. 28, 2011

(87) PCT Pub. No.: WO2010/023074
PCT Pub. Date: Mar. 4, 2010

(65) Prior Publication Data
US 2011/0146666 A1    Jun. 23, 2011

(30) Foreign Application Priority Data

Aug. 26, 2008  (IT) .......................... MI2008A001537

(51) Int. Cl.
*F24J 2/46* (2006.01)

(52) U.S. Cl.
USPC ............................ 126/704; 126/652; 126/653

(58) Field of Classification Search
USPC ......................... 126/652, 653, 654, 659, 704; 29/890.033
See application file for complete search history.

(56) References Cited

U.S. PATENT DOCUMENTS

| | | | | |
|---|---|---|---|---|
| 2,415,433 A | * | 2/1947 | Little .............................. | 33/270 |
| 3,961,619 A | * | 6/1976 | Estes et al. .................... | 126/666 |
| 4,132,218 A | * | 1/1979 | Bennett ......................... | 126/704 |
| 4,172,311 A | * | 10/1979 | Heyman ................... | 29/890.033 |
| 4,243,020 A | * | 1/1981 | Mier ............................. | 126/670 |
| 4,285,335 A | * | 8/1981 | Simmons et al. ............. | 126/660 |
| 4,332,241 A | * | 6/1982 | Dalstein et al. ............... | 126/711 |
| 2007/0039611 A1 | * | 2/2007 | Benvenuti ..................... | 126/652 |
| 2010/0006090 A1 | | 1/2010 | Palmieri | |
| 2010/0313876 A1 | | 12/2010 | Palmieri | |
| 2011/0072662 A1 | | 3/2011 | Palmieri | |

FOREIGN PATENT DOCUMENTS

| | | |
|---|---|---|
| DE | 27 28 019 | 1/1979 |
| FR | 2 483 564 | 12/1981 |
| FR | 2 492 956 | 4/1982 |
| WO | 2005 075900 | 8/2005 |

OTHER PUBLICATIONS

International Search Report issued Dec. 28, 2009 in PCT/EP09/060204 filed Aug. 6, 2009.
U.S. Appl. No. 13/120,565, filed Mar. 23, 2011, Palmieri.

* cited by examiner

*Primary Examiner* — Kenneth Rinehart
*Assistant Examiner* — Jorge Pereiro
(74) *Attorney, Agent, or Firm* — Oblon, Spivak, McClelland, Maier & Neustadt, L.L.P.

(57) ABSTRACT

A vacuum solar thermal panel includes a vacuum envelope defining a sealed volume able to withstand atmospheric pressure when evacuated. The envelope includes a first plate made of glass, a second plate facing the first plate, a perimeter frame disposed between the first and second plate close to their edge, a metallic perimeter belt joining the perimeter frame to the first plate, a plurality of spaced apart bearing elements disposed against the edges of the first and second plate, and a plurality of traction rods joining the bearing elements with the perimeter frame to pull the perimeter frame toward the bearing elements, in order to limit the deformation of the perimeter frame under the external atmospheric pressure, when the envelope is evacuated.

13 Claims, 6 Drawing Sheets

LIGHTWEIGHT STRUCTURE VACUUM SOLAR THERMAL PANEL

The present invention relates to a lightweight structure vacuum solar thermal panel according to the preamble of the main claim.

Existing vacuum solar thermal panels comprise a flat vacuum tight envelope with a glass plate transparent to visible solar radiation. Inside the vacuum envelope are disposed heat absorbers and a pipe entering and exiting the envelope connected to the heat absorbers. The solar radiation enters the envelope through the glass plate, is absorbed by the heat absorbers and converted into heat, which is transferred to the pipe and to the heat transfer fluid flowing in the pipe. Vacuum is kept inside the envelope enclosing the heat absorbers and part of the pipe connected to them, in order to prevent heat from escaping to the external environment by means of convection.

U.S. Pat. No. 4,332,241 and EP 1706678 disclose a vacuum solar thermal panel comprising a vacuum envelope defined by two parallel glass plates, a metallic support chassis and a metallic perimeter wall for supporting the glass plates in a spaced-apart arrangement. U.S. Pat. No. 4,332,241 discloses an outer frame disposed around the whole outer edges of the panel glass plates for purpose of protection of said edges. This frame increases the total weight of the metal support structure. The perimeter wall of an evacuated flat solar panel must be stiff enough to withstand the external atmospheric pressure without suffering a significant deformation in order not to damage the vacuum tight glass-metal seal between the glass plate and the perimeter wall itself.

A problem of the existing vacuum solar thermal panels is that the perimeter wall is particularly thick, in order to obtain the desired stiffness. This results in the whole panel being heavy and thus difficult to handle.

U.S. Pat. No. 4,332,241 discloses a vacuum tight solar panel comprising an outer frame disposed around the whole outer edges of the panel glass plates for purpose of protection of said edges.

An object of the present invention is to overcome the above mentioned limitations, by providing a vacuum solar thermal panel comprising a flat vacuum envelope peripherally defined by a perimeter wall, which is light and thin but stiff enough not to be subjected to excessive deformations when the envelope is evacuated.

The present invention will be more fully understood and appreciated from the following detailed description taken in conjunction with drawings, in which.

Figure 1:
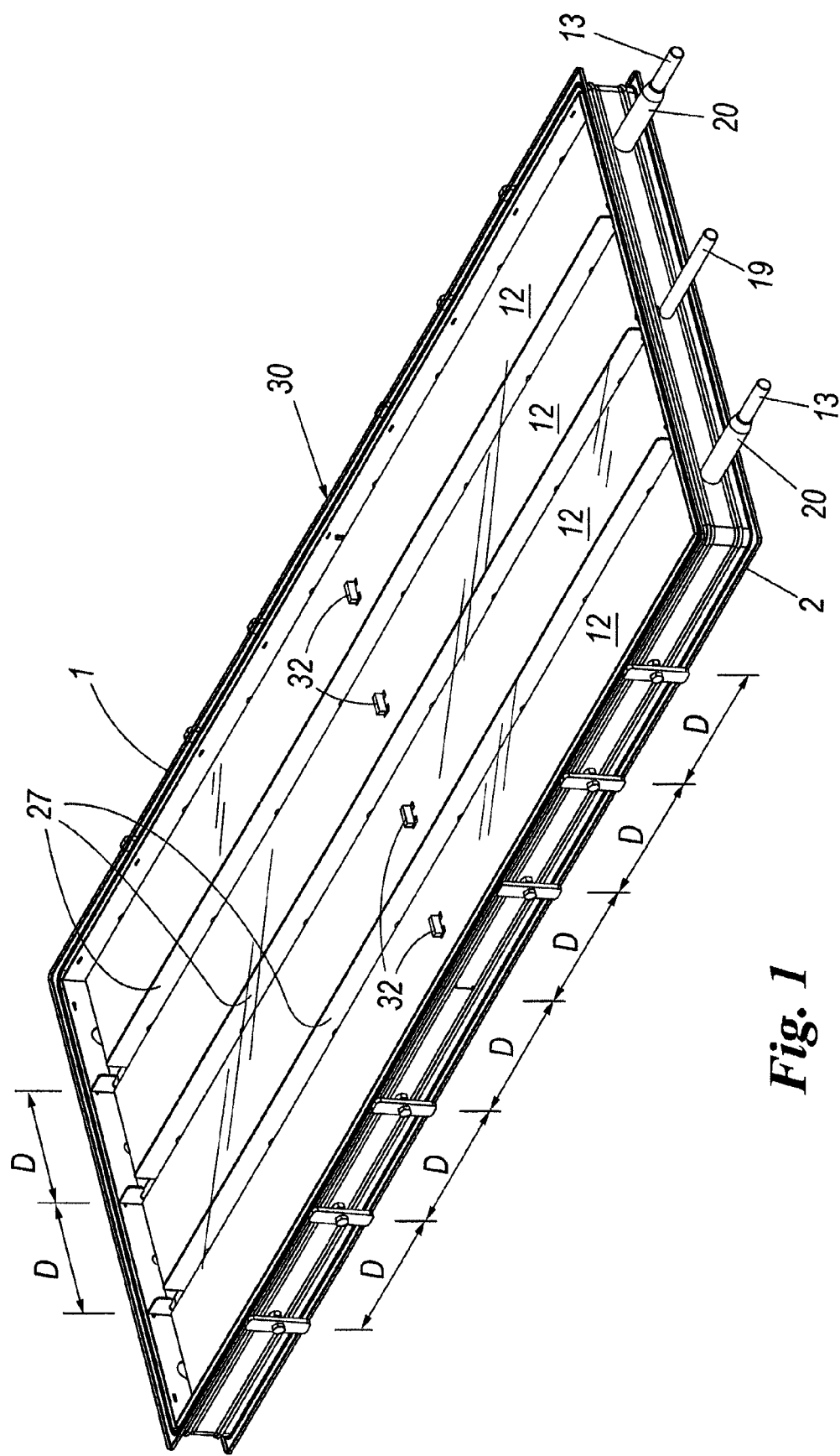
FIG. 1 represents a perspective view of a vacuum solar thermal panel according to the invention.
Figure 2:
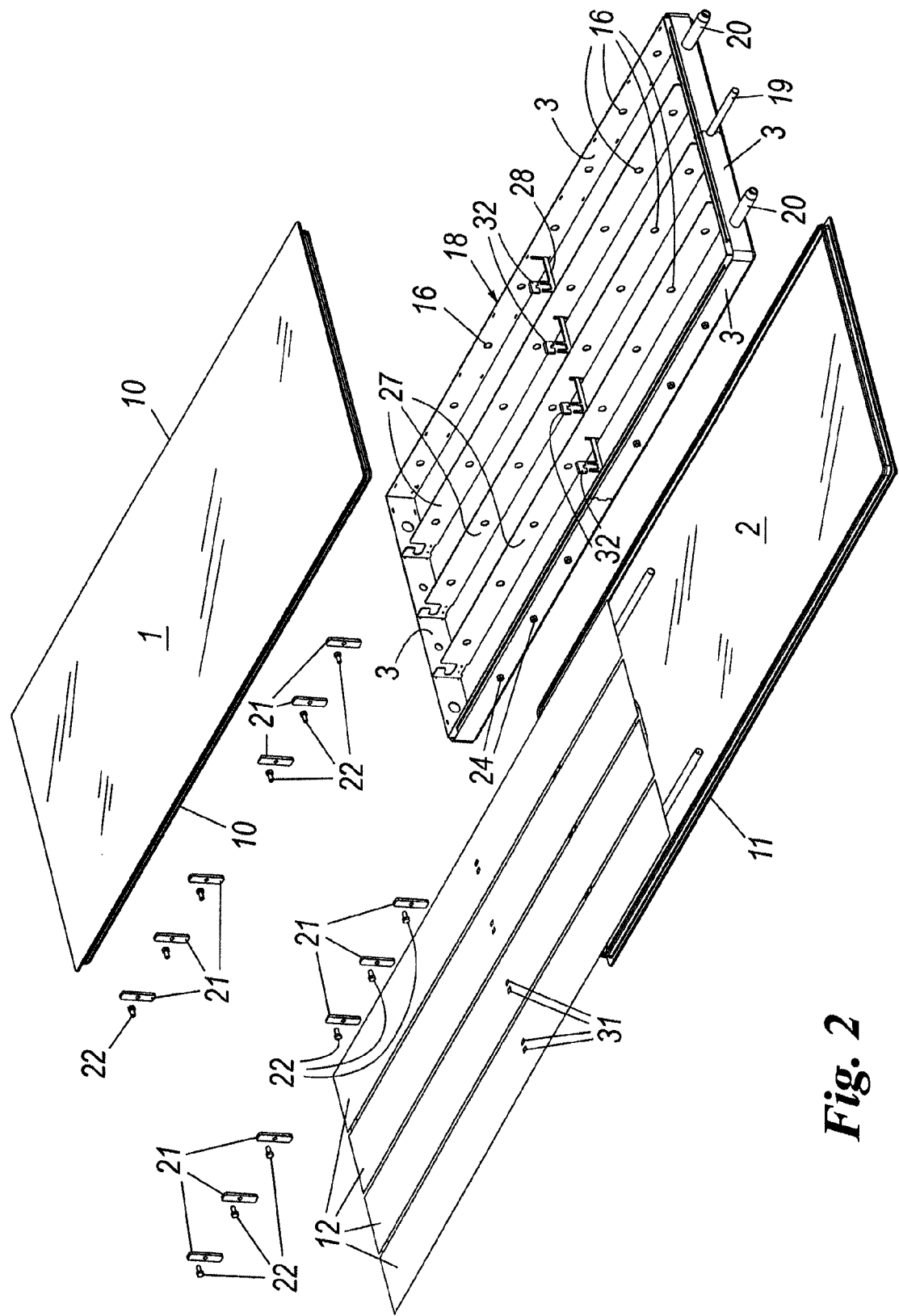
FIG. 2 shows an exploded view of the panel.

Referring to the double sided embodiment of the invention represented in figures from 1 to 3, the vacuum solar thermal panel comprises an envelope 30 defining a sealed volume, able to withstand atmospheric pressure when evacuated, heat absorbers 12 disposed inside the vacuum envelope 30, a pipe 13 entering and exiting the envelope 30 through an exit port 20 minimizing the heat transfer between the pipe 13 and the vacuum envelope 30, said pipe 13 being in contact with the heat absorber 12, so that heat can easily flow from the heat absorbers to the fluid flowing through the pipe 13. The heat absorbers 12 are generally rectangular sheets of copper welded to the pipe 13 in order to obtain a good thermal contact. The vacuum envelope 30 comprises a first plate 1 made of glass, a second plate 2 facing the first plate 1, both plates having substantially a rectangular shape delimited by edges 10 and 11, a support chassis 18 disposed between the first and second plate 1, 2 to support them in a spaced-apart arrangement, and a perimeter wall disposed close to the edges of the first and second plates 1 and 2 and peripherally defining the vacuum envelope 30. Said support chassis 18 has the role of supporting the first and second plate 1, 2 to make them resistant to atmospheric pressure, without collapsing or breaking and at the same time of hosting the heat absorbers 12 and the pipe 13 connected to them. Said perimeter wall comprises a metallic perimeter frame 3 and two metallic perimeter belts 4, 5 joined to the perimeter frame 3 by means of vacuum tight soldering, brazing or welding and to the first and second plates 1 and 2 by means of a vacuum tight glass-metal seal 8, 9 obtained by fusion and subsequent solidification of glass material embedding the edge of the perimeter belt, according to MI 2008A001245.

The support chassis 18 comprises three equally spaced longitudinal elements 27, spot welded to one transverse element 28 and surrounded by the perimeter frame 3, forming part of the perimeter wall.

Figure 3:
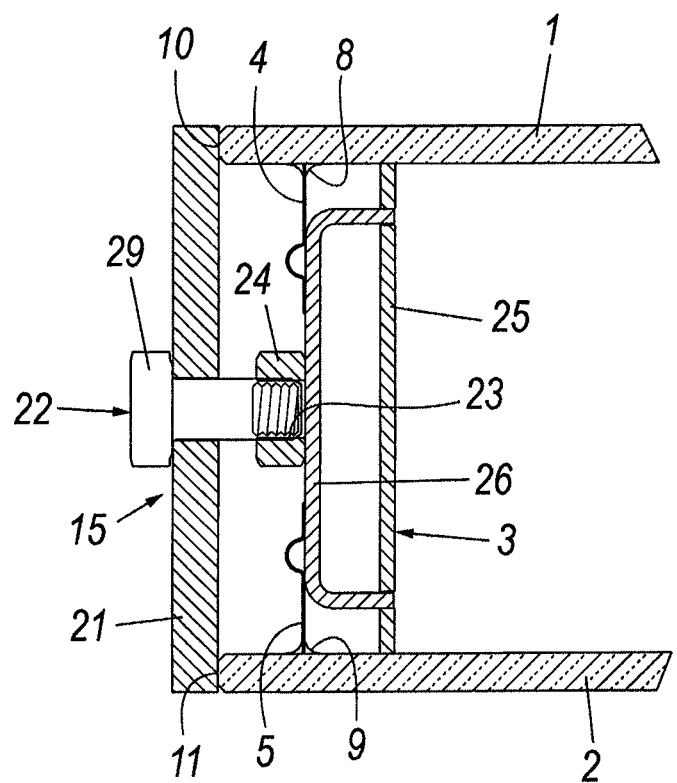
FIG. 3 represents a cross section of the perimeter wall of a double sided vacuum solar thermal panel.

The perimeter frame 3 comprises a spacer 25 to keep the first and the second plate 1, 2 in a spaced-apart arrangement and a stiffener 26 joined to the spacer 25 and presenting a curved cross section, e.g. a "C" shaped cross section as in FIG. 3 allowing for accommodation of a glass-metal seal meniscus close to the first and second glass plate 1, 2 surfaces.

The vacuum solar thermal panel also comprises twelve bearing elements 21 disposed at the edges 10 and 11 of the first and second plate 1, 2, each one of them being connected to the perimeter frame 3 by a traction rod 22 to be put under tension by means of a traction mechanism 15.

In FIG. 3 the traction mechanism 15 comprises a threaded coupling, said traction rod being a bolt 22, screw-engaged in a nut 24 welded to the perimeter frame 3. The nut 24 presents a threaded hole 23 for a screwed connection with said bolt 22, realising said traction mechanism. Instead of nuts welded to the perimeter frame, the stiffener 26 can present an adequate number of threaded pits for a screw engagement with the bolts 22.

The bearing elements, disposed against the edges 10, 11 of the first and second plates 1, 2, can be rectangular washers 21, long enough to simultaneously touch both edges of the first and second plate 1 and 2. Each washer 21 presents a hole for the insertion of the bolt 22, which presents a head 29 large enough to lean against the side of the washer hole. Washers 21 can also present a "C" shape with curved ends extending over the edges of the glass plates 1 and 2, to prevent an undesired rotation, which could lead to disengagement.

The bolt 22, inserted in a hole of the washer 21, is screw-engaged with the nut 24 and tightens to pull the perimeter frame 3 toward the washer 21 and to press the washer 21 against the edges 10, 11 of the first and second glass plate 1 and 2, thus opposing the action of the external atmospheric pressure, which is transferred to the edges of the first and second glass plate 1 and 2. In this way the deformation of the perimeter frame 3 under vacuum, because of the external atmospheric pressure, is limited or prevented, though the perimeter frame itself is thin and therefore lightweight.

Referring to FIG. 1, the two shorter sides of the perimeter frame 3 (without bearing elements 21) are supported by the three longitudinal elements 27, while the two longer sides of the perimeter frame 3 (with bearing elements) are supported centrally by the transverse element 28. In FIG. 1 the perimeter frame 3 is therefore supported on 20 different points (support points): twelve points corresponding to the bearing elements 21 or traction rods 22, two corresponding to the contact points between the transverse element 28 and the perimeter frame 3 and six corresponding to the contact points between the longitudinal elements 27 and the perimeter frame 3. Obviously an embodiment of the invention can have less or more than twelve bearing elements 21 and traction rods 22 as shown in FIG. 1. If the spacer 25 and the stiffener 26 are both 2 mm thick, to sufficiently reduce the deformation of the perimeter frame 3 under the external atmospheric pressure when the envelope (30) is evacuated, each support point is conveniently spaced apart from the next one by a distance D comprised between 160 and 240 mm, preferably 200 mm.

Figure 4:
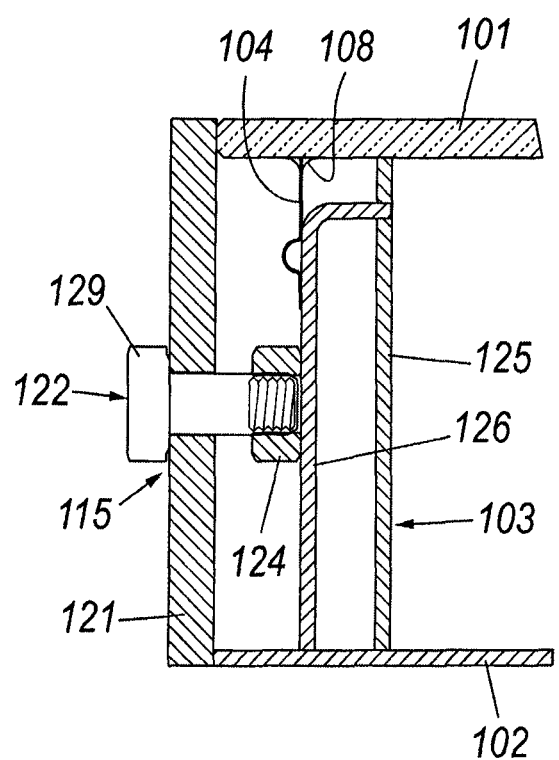
FIG. 4 represents a cross section of the perimeter wall of a single sided vacuum solar thermal panel.

In the single sided embodiment represented in FIG. 4, in which elements corresponding to the first embodiment are indicated by the same numeral plus 100 (i.e., traction mechanism 115, bearing element(s) 121, traction rod 122, nut 124, and head 129), the vacuum solar thermal panel comprises a first glass plate 101 and a second plate 102 made of metal. The perimeter frame 103 comprises a spacer 125 and a stiffener 126, said latter presenting a substantially "L" shaped cross section. One end of the L is joined to the spacer 125, while the other end is joined to the metal plate 102. In this case only one perimeter belt 104 is present, connecting the perimeter frame 103 to the glass plate 101 by means of a vacuum tight glass-metal seal 108, the stiffener 126 being directly vacuum tight soldered, brazed or welded to the metal plate 102.

The traction rod 22 and the perimeter frame 3 can evidently be formed such that the traction rod 22 is coupled to the perimeter frame 3 by a hooking device (for example a bayonet, a cotter pin or a hook coupling) and then put under tension by a traction mechanism such as a lever device, which pushes against the bearing element 21. In case of coupling by a hooking device, tension in the traction rods 22 can also be created by a small deformation of the perimeter frame 3 under atmospheric pressure, when the envelope 30 is evacuated.

In both embodiments the longitudinal elements 27, the transverse element 28 and the perimeter frame 3 of the support chassis 18 are preferably made of steel (2 mm thick) with inner surfaces possibly mirror polished or coated to improve reflectivity. Steel should be chosen such as to match the Coefficient of Thermal Expansion (CTE) of the glass plates (for soda lime glass, Fe 430 steel or AISI 430 stainless steel should be used). As shown in FIG. 1, multiple evacuation holes 16 can facilitate panel evacuation, reducing pumping impedance.

Longitudinal 27 and transverse 28 elements should be specially shaped to house and support the pipe 13 connected to the heat absorbers. Also one of the two sides of the perimeter frame 3 should feature pass-through holes to insert exit ports 20, for enabling the pipe 13 to enter and leave the vacuum envelope 30 with minimum heat transfer losses due to conduction and a pumping port 19, for evacuating the envelope 30.

Figure 5:
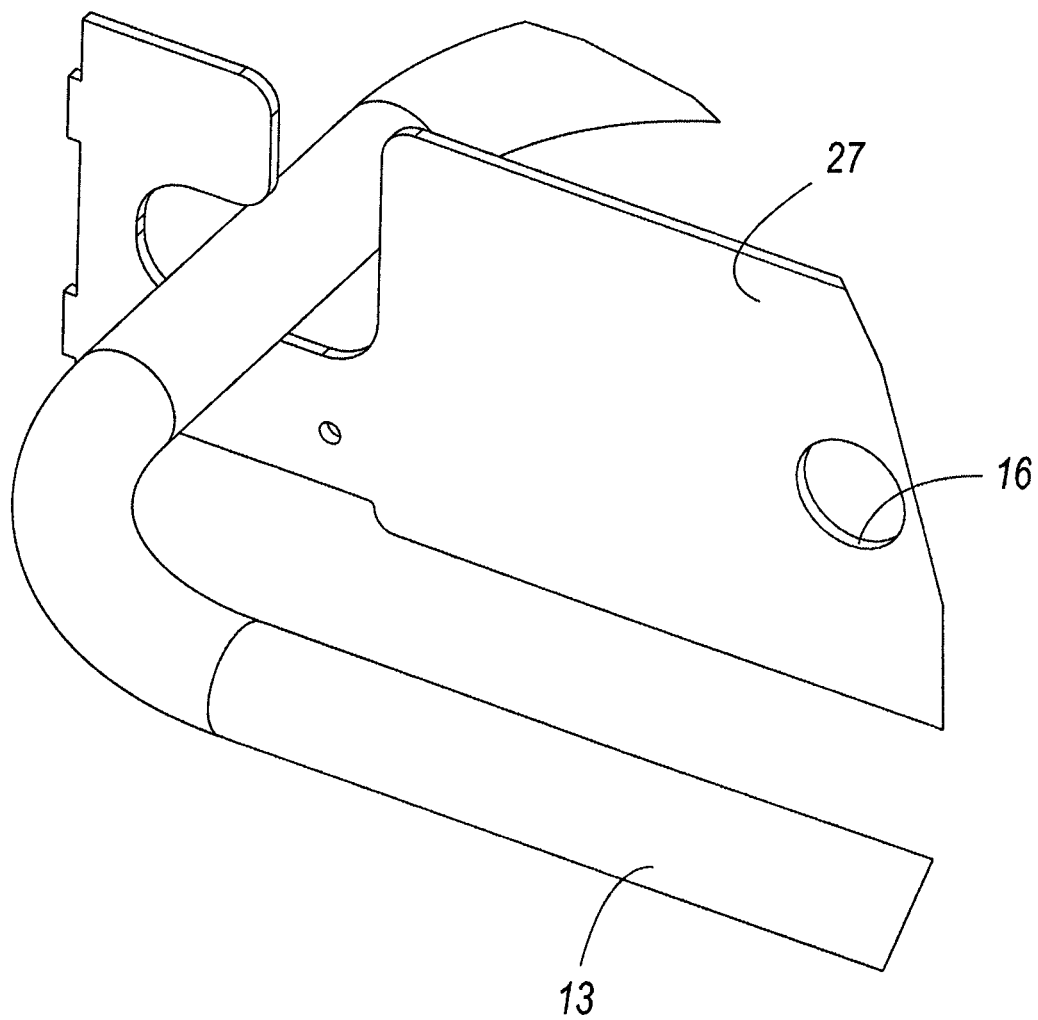
FIG. 5 shows specially shaped cut holes in a longitudinal element of the support chassis, supporting the traversing heat absorber pipe.

As shown in FIG. 5, specially shaped cut holes in the longitudinal elements 27 support the traversing heat absorber pipe 13, with minimal surface contact, while allowing for pipe thermal expansion with increasing temperature (which for a 1.5 meter copper pipe heated to 400° C. corresponds to about 10 mm).

Figure 6:
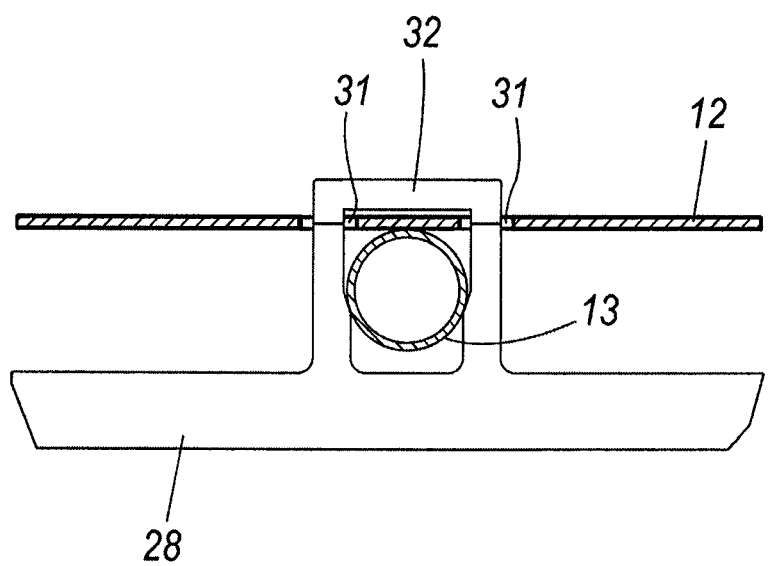
FIG. 6 shows a clamping fork of the transverse element of the support chassis, supporting the traversing heat absorber pipe.

As shown in FIG. 6, the transverse element 28 is specially shaped in order to clamp the pipe 13 through clamping holes 31 in the heat absorbers 12 and lock the same pipe 13 to said transverse element 28 by means of the locking anchor 32. Such holes 31 should be made long enough to accommodate heat absorber expansion with increasing temperature (which for 0.75 meter copper heat absorber 12 heated to 400° C. corresponds to about 5 mm).

Also, in order to further reduce thermal losses due to conduction, both longitudinal 27 and transverse 28 elements of the support chassis 18 (or parts of the same) could be manufactured using low thermal conductivity materials, like titanium or ceramic compounds.

One advantage of the present invention is that the perimeter frame 3 is thin and therefore lightweight and the whole panel is thus much lighter.

Another advantage is that, the perimeter frame 3 being lightweight and flexible, it can be easily inserted inside the perimeter belts 4 and 5, during the panel assembly process (with the bolts 22 not yet in place) and then vacuum tight soldered, brazed or welded to the same belts without requiring strict tolerance in parts manufacturing.

Another advantage is that heat absorbers 12 and pipe 13 are supported and firmly held in place, while at the same time minimizing heat transfer losses due to conduction and allowing for their thermal expansion at high temperature.

The invention claimed is:

1. A vacuum solar thermal panel, comprising:
   a vacuum envelope defining a sealed volume that is able to withstand atmospheric pressure when evacuated;
   at least one heat absorber disposed inside the vacuum envelope; and
   a pipe entering and exiting the envelope and in contact with the heat absorber,
   the vacuum envelope comprising a first plate made of glass, a second plate facing the first plate, both plates being delimited by edges, a perimeter frame disposed between the first and second plate close to their edges, a metallic perimeter belt joining the perimeter frame to the first plate, a bearing body disposed at the edges of the first and second plate, and traction rods joining said body with said perimeter frame, wherein
   the bearing body includes a plurality of spaced apart bearing elements, each provided with at least one of said traction rods,
   the bearing elements limit deformation of the perimeter frame under the atmospheric pressure when the envelope is evacuated, and
   end portions of the bearing elements are in direct contact with and pressed against the edges of the first and second plates to oppose an action of the atmospheric pressure, when the envelope is evacuated, that is transferred to the edges of the first and second plates, to limit the deformation of the perimeter frame under the atmospheric pressure.

2. The vacuum solar thermal panel according to claim 1, further comprising a traction mechanism putting the traction rods under tension, to pull the perimeter frame toward the bearing elements.

3. The vacuum solar thermal panel according to claim 2, wherein the traction mechanism comprises a threaded coupling.

4. The vacuum solar thermal panel according to claim 3, wherein the threaded coupling comprises a bolt.

5. The vacuum solar thermal panel according to claim 3, wherein the threaded coupling comprises a nut.

6. The vacuum solar thermal panel according to claim 1, wherein the bearing elements each comprise a washer that is long enough to simultaneously touch both of the edges of the first and second plates.

7. The vacuum solar thermal panel according to claim 1, wherein the perimeter frame comprises a spacer to keep the first and the second plate in a spaced-apart arrangement and a stiffener joined to the spacer and having a curved cross section.

8. The vacuum solar thermal panel according to claim 7, wherein the second plate is made of glass and the stiffener has a substantially "C" shaped cross section.

9. The vacuum solar thermal panel according to claim 7, wherein the second plate is made of metal and the stiffener has a substantially "L" shaped cross section.

10. The vacuum solar thermal panel according to claim 7, wherein:
the spacer extends vertically between the first and second plates,
the stiffener is coupled to one of the traction rods at a medial portion of the stiffener in cross section that extends vertically between the first and second plates,
the stiffener includes a first bent portion that is joined to the spacer,
the bent portion is joined to the metallic perimeter belt, which is joined to the first plate, and
the stiffener does not directly contact the first plate.

11. The vacuum solar thermal panel according to claim 10, wherein:
the spacer extends vertically between the first and second plates,
the stiffener includes a second bent portion that is joined to the spacer,
the second bent portion is joined to another metallic perimeter belt, which is joined to the second plate, and
the stiffener does not directly contact the second plate.

12. The vacuum solar thermal panel according to claim 10, wherein a gap is provided between the medial portion of the stiffener and the spacer in cross section.

13. The vacuum solar thermal panel according to claim 1, wherein the perimeter frame has at least two support points disposed at a distance from each other comprised between 160 and 240 mm.

* * * * *